Feb. 19, 1963 F. J. ALTERMAN 3,078,056
REELING SYSTEM FOR RECORDING TAPE
Filed Feb. 23, 1961
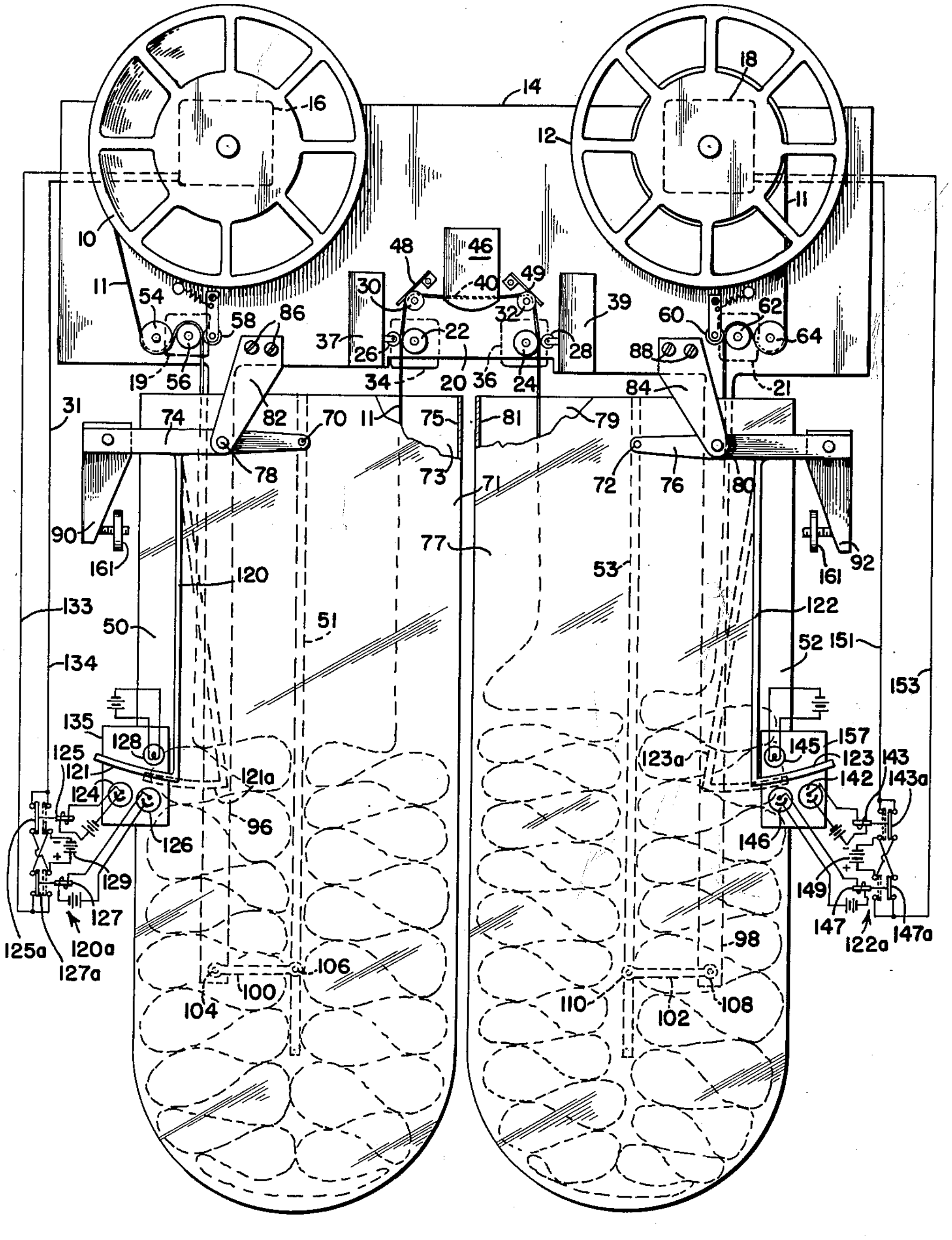
INVENTOR.
FRANCIS J. ALTERMAN
BY Kenneth D. Ohm
ATTORNEY United States Patent Office 3,078,056
Patented Feb. 19, 1963

3,078,056

REELING SYSTEM FOR RECORDING TAPE

Francis J. Alterman, Minneapolis, Minn., assignor to General Mills, Inc., a corporation of Delaware Filed Feb. 23, 1961, Ser. No. 91,059
7 Claims. (Cl. 242—55.12)

This invention relates to tape handling devices and particularly to recording tape reeling systems. The invention is particularly well adapted for use with magnetic tape memory devices in conjunction with automatic digital computers.

In some devices wherein tape reeling is required, for example in computers, it is desirable to start and stop the tape very rapidly as well as reverse the direction of travel of the tape in a fraction of a second. In some computers, utilizing tape travelling at speeds on the order of 150 inches per second, it is desirable to stop the tape and reverse its direction in less than 3 milliseconds. It has been found impractical to attempt to start and stop the storage reels upon which the tape is wound at accelerations on the order of those just mentioned because of the relatively large mass of the tape and reel upon which said tape is wound. It has therefore been proposed previously that a quantity of unwound tape can be stored in suitable bins located between the transducer and each storage reel. Because of the slack provided in such bins, the portion of the tape passing over the transducer can be accelerated and decelerated by a separate drive or capstan more rapidly than the tape on the reels. To make possible rapid acceleration of the tape, it is desirable to have available a relatively large quantity of unwound tape on either side of the transducer and yet at the same time it is necessary to provide accurate coordination between the reel drive and capstan drive.

United States Patent No. 2,864,621 shows a system wherein an inequality in the quantity of unwound tape on either side of the recording head energizes the reel drive means. Each storage reel will, of course, wind the tape at a different speed depending upon whether said reel is full or empty thereby resulting in different filling and emptying speeds for each bin. This can result in overfull or underfull conditions in the bins of the above-noted patent.

It is a general object of this invention to provide a high speed tape reeling machine having improved means for automatically unwinding and rewinding the tape.

It is another general object of the present invention to provide an improved tape reeling control apparatus wherein the transducer drive mechanism can be started and stopped very rapidly without causing either excessive slack or excessive tension on the tape.

It is another object of the present invention to provide an improved tape reeling control system wherein a relatively large quantity of unwound tape can be stored between each reel and the transducer.

It is a still further object of this invention to provide an improved tape reeling control system wherein the linear speed at which tape is wound or unwound from the supply reel will not adversely effect operation of the device.

It is another object of this invention to provide an improved tape reeling system having means for accurately controlling the total amount of unwound tape stored in each of the bins.

Briefly stated, the present invention provides an apparatus for handling, feeding or reeling continuous strips of sheet materials such as magnetic recording tape including a frame and first and second winding means such as tape storage reels rotatably mounted on said frame. First and second drive motors operate the first and second reels respectively. A transducer which may be adapted for recording or for picking up information stored on the tape is attached to the frame and is operatively associated with a portion of the tape extending between the reels. A capstan of known construction capable of rapidly starting, stopping, and reversing the direction of the tape moving across said transducer is mounted on the frame adjacent to the transducer. First and second storage means such as tape bins are yieldably attached to the frame for movement along a vertical axis. The first bin is adapted to receive a quantity of unwound tape extending between said first reel and the capstan. The second bin is adapted to receive a quantity of unwound tape extending between said second reel and the capstan. Both the first and second yieldable support means preferably include a lever arm pivotally connected to the frame. Each storage bin is connected to one end of one of said lever arms. To the other end of each lever arm is connected a suitable counterweight. One counterweight is adapted to balance the weight of said first bin when filled with a predetermined amount of tape. The other counterweight will balance the second bin when filled with a predetermined amount of tape. A first sensing means such as a photocell is operatively connected to said first storage means and said first drive motor for sensing the weight of said first storage means and the tape contained therein. A first control means such as a switch operable by said first sensing means is provided for controlling the operation of said first drive motor in response to change the weight of said first storage bin. Second sensing means such as photocell sensing means is operatively connected to said second storage means and said second drive motor for sensing the weight of said second storage means and the tape contained therein. A second control means such as a switch operable by said second sensing means is provided for controlling the operation of said second drive motor in response to change in the weight of the second storage bin.

Additional objects of the invention will appear from the following description in conjunction with the accompanying drawing in which a preferred embodiment has been set forth in detail.

The FIGURE is a side elevation of an apparatus illustrating the present invention.

Referring now to the drawing, there are shown two tape reels 10 and 12 upon which a magnetic tape 11 is wound. The tape reels 10 and 12 are rotatably mounted on a frame member 14 and each of them is driven by a suitable drive motor designated by numerals 16 and 18 respectively. A motor 19 is connected to tension roller 56 through a slip clutch (not shown). Similarly motor 21 is connected to the shaft of tension roller 62 through slip clutch (not shown). While the machine is in operation, motors 19 and 21 run continuously, motor 19 in a clockwise direction and motor 21 in a counterclockwise direction as viewed in the figure thereby maintaining slight tension on the segments of the tape 11 extending between the rollers 56, 62, and the reels 10, 12 regardless of the speed or direction of rotation of each of the reels. A capstan driving means 20 acts on a portion of the tape 11 extending between the two reels 10 and 12. The capstan 20 is adapted to start and stop the tape 11 very rapidly and is generally similar to previously described capstans used in conjunction with tape reeling mechanisms for computers.

The capstan 20 includes driven rollers 22 and 24 and idler rollers 26, 28, 30, and 32. Each of the rollers 22 and 24 has affixed to the shaft thereof drive motors designated 34 and 36 respectively. During operation, drive motor 34 runs at a constant speed in a counterclockwise direction as viewed in the figure while motor 36 runs at a constant speed in a clockwise direction as viewed in the figure. Activation of one of the solenoids 37 and 39 either manually or by a programmed signal causes one of the idler rollers 26 and 28 respectively to move into tangential abutting relationship with the adjacent section of tape 11 so as to force the tape into contact with the rim of either the roller 22 or the roller 24 as desired. Since the latter two rollers run in opposite directions, the direction of travel of the tape 11 can be very rapidly reversed depending upon which of the solenoids 37 or 39 is activated.

The magnetic recording tape 11 passes from a bin 50 first between the rolls 26 and 22, then over the roller 30, past a transducer 46, over the roller 32, and finally between the rollers 24 and 28. The tape is maintained under a predetermined tension as it passes over the transducer 46 through the action of tensioning members 48 and 49 which press against the exposed surface of the tape passing over the rollers 30 and 32. When either of the solenoids 37 or 39 is activated, the portion of the tape 11 running over the transducer 46 is accelerated very rapidly. For example, said portion of the tape may be accelerated from zero to a speed on the order of 150 inches per second in as little as 3 milliseconds.

To prevent the rapid acceleration of the tape 11 through the capstan 20 from breaking the tape withdrawn from the more slowly accelerating reels 10 and 12, there is provided a supply of unwound tape between each reel and the capstan. This supply of tape is contained in storage bins 50 and 52. Bin 50 includes a front wall 71, a back wall 73, and a side wall 75. Bin 52 includes a front wall 77, a back wall 79, and a side wall 81. The width of each bin from the front wall to the back wall thereof is slightly greater than the width of the tape 11. The tape unwound from the reel 10 passes first under an idler roller 54 then over the tension roller 56, between the roller 56 and a roller 58 and then downwardly into the bin 50 on one side of a divider 51 where the tape falls into a number of transverse folds. The tape then passes upwardly on the other side of the divider 51 through the capstan as explained hereinbefore, then downwardly into the bin 52 on one side of a divider 53 where the tape also falls into a number of transverse folds. The tape 11 extends upwardly on the other side of the divider 53 between an idler roller 60 and the tension roller 62, then over the roller 62, under an idler roller 64 and is then wound onto the reel 12.

Bins 50 and 52 are pivotally supported by pins 70 and 72 respectively of horizontally extending lever arms 74 and 76 respectively. Lever arms 74 and 76 are in turn pivotally mounted on pins 78 and 80 respectively. Pins 78 and 80 are supported from the lower end of brackets 82 and 84 respectively. Brackets 82 and 84 are affixed to the frame 14 by any suitable connecting means such as screws 86 and 88. Counterweights 90 and 92 are provided at the free end of levers 74 and 76 respectively. The purpose of the counterweights 90 and 92 is to balance the weight of the bins 50 and 52 respectively when the bins are filled with tape to a predetermined level. Pivot pins 78 and 80 thus serve as the fulcrum for levers 74 and 76 respectively. The lower portions of bins 50 and 52 are connected to downwardly extending frame members 96 and 98 respectively by means of connecting members 100 and 102 respectively. Lever 100 is connected at one end to frame member 96 by means of pivot pin 104 spaced vertically downward from pivot pin 78. The other end of the connecting member 100 is pivotally affixed to the bin 50 by means of a pivot pin 106 spaced vertically downward from the pivot pin 70. In a similar manner the connecting member 102 is pivotally connected to the frame member 98 by means of a pivot pin 108 spaced vertically downward from the pivot pin 80 while the other end of the member 102 is pivotally connected to the bin 52 by means of a pivot pin 110 spaced vertically downward from the pivot pin 72. The connecting means 100 and 102 thus prevent undesired lateral movement of the lower ends of the bins 50 and 52.

The control means for regulating the amount of tape stored in each of the bins 50 and 52 and for coordinating the drive motors 16, 18, 19, and 21 and the capstan 20 will now be explained.

Connected to levers 74 and 76 respectively are means for controlling the operation of the drive motors 16 and 18. The drive motor control means includes two control members 120 and 122 affixed to levers 74 and 76 respectively. Photocells 124 and 126 and a lamp 128 are operatively associated with the lever 120 while photocells 142 and 146 are operatively associated with the lever 122 and a lamp 145. The photocells 124 and 126 and lamp 128 associated with bin 50 are supported from a fixed bracket 135 while the photocells 142 and 146 and the lamp 145 associated with bin 52 are supported from bracket 157.

The lever 120 has affixed to the lower end thereof an opaque vane 121 which lies in a plane extending between the lamp 128 and the photocells 124 and 126. Similarily, at the lower end of the lever 122 there is affixed an opaque vane 123 which is positioned in a plane extending between the lamp 145 and the photocells 142 and 146.

In preparing the apparatus for operation, any desired amount of tape is placed in each of the bins 50 and 52. The weight of each filled bin 50 and 52 is then balanced with the associated counterweight 90 and 92 respectively so that the free end of each vane 121 and 123 respectively is intermediate of its two associated photocells 124, 126 and 142, 146 respectively. Small weights such as 161 may be used for fine balancing. The intermediate positions of vanes 121 and 123 are shown when said vanes are in their dotted positions **121*a* and 123*a*. When the vane 121 is in its intermediate position 121*a*, it cuts off the light from the lamp 128 to the photocells 126, but allows the other photocell 124 to be exposed to the light from said lamp. If additional tape is added to bin 50, the vane 121 moves to the left from its dotted position 121*a* and if tape is taken from said balanced bin 50, the vane 121 moves to the right from said dotted position. It can thus be seen that when enough additional tape is placed in the bin 50, light from the lamp 128 to both of the photocells 124 and 126 will be cut off. If the quantity of the tape in the bin 50 is reduced, both of the photocells 124 and 126 will be exposed to said lamp. The photocells 124 and 126 are wired to a suitable switching means 120*a* for starting, stopping and reversing the motor 16. Similarly the photocells 142 and 146 are wired to a suitable switching means 122*a* for starting, stopping and reversing the motor 18**.

Coordination between the capstan drive and the motors 16 and 18 is accomplished in the following manner. Photocell 124 is wired in series with a relay 125 and the photocell 126 is wired in series with a relay 127. When no light from lamp 128 reaches either photocell 124 or 126, as illustrated in the figure, no current flows through said photocell circuits and the contacts **125*a* and 127*a* of the relays 125 and 127 are urged to their solid line positions by suitable springs (not shown). When the contacts 125*a* and 127*a* are in their solid line positions they are wired in series with a direct current power supply 129 and the direct current motor 16. With the contacts 125*a* and 127*a* in their solid line positions, current from the D.C. power supply 129 is supplied to the motor 16 through conductors 133 and 134**. This current causes said motor to rotate in what will be called its forward direction for the purpose of explanation.

When, on the other hand, both photocells 124 and 126 are exposed to the light of the lamp 128, current passes through both of said photocell circuits causing the contacts **125*a* and 127*a* of the relays 125 and 127 to move to their dotted line positions. When contacts 125*a* and 127*a* are in said dotted line positions they are each connected to the opposite poles of the D.C. power supply 129 from which they each were connected in their solid line positions. Thus, when the photocells 124 and 126 are both exposed to the light of lamp 128, current flows through the conductors 133 and 134** in a direction which is reverse from that when said photocells were not exposed to said lamp light. This reverse flow of current causes the motor 16 to rotate in a direction which is reverse to the above mentioned forward direction.

When the free end of the vane 121 is intermediate the photocells 124 and 126, i.e., in its dotted position 121*a*, only photocell 124 is exposed to the light of lamp 128. Thus, only the relay 125 is actuated. The contact 125*a* therefore moves to its dotted line position while contact 127*a* remains in its solid line position. As can be seen, this results in an open circuit between the power supply 129 and the motor 16 and said motor does not rotate.

The control of the motor 18 by means of the vane 123, the lamp 145, and the photocells 142 and 146 is in all respects similar to the control of the motor 16 by the photocells 124 and 126. The photocell 142 is wired in series with a relay 143 and the photocell 146 is wired in series with a relay 147. Each of the relays 143 and 147 have contacts 143*a* and 147*a* respectively. When contacts 143*a* and 147*a* are in their solid line positions, current from a D.C. power source 149 is supplied to the motor 18 through the conductors 151 and 153. This current causes said motor to rotate in what will be called the forward direction for the purpose of the explanation. Changes in the weight of the bin 52 resulting from increase or decrease in the supply of tape contained therein, causes the vane 123 to expose or shield the photocells 142 and 146 from the light of the lamp 145 thereby resulting in forward or reverse rotation or stoppage of motor 18 in a manner similar to the control of the motor 16.

Thus, when the reel 10 has fed an over supply of tape to the bin 50 so that the weight of the bin and tape contained therein is greater than that of the counterweights 90 and 161, the lever arm 74 turns clockwise about the pivot pin 78 as viewed in the figure causing the vane 121 to cut off light from lamp 128 to both of the photocells 124 and 126. This in turn causes the drive motor 16 to rotate in the forward direction. When the motor 16 rotates in a forward direction it drives reel 10 clockwise as viewed in the figure so that tape is withdrawn from the bin 50. When the vane 123 covers the photocell 126 but allows the photocell 124 to be exposed to the light of the lamp 128, the motor 16 is turned off. When too little tape remains in the bin 50, the lever 74 pivots counterclockwise about the pin 78 as viewed in the figure and the vane 121 moves to the right exposing both of the photocells 124 and 126 to the light of the lamp 128. This in turn causes the drive motor 16 to rotate in the reverse direction. When the motor 16 rotates in the reverse direction it causes the reel 10 to turn counterclockwise. This in turn, causes the reel 10 to transport tape downwardly from the reel 10 into the bin 50.

The quantity of tape in the bin 52 is controlled in a manner similar to the control of the quantity of tape in bin 50 as above set forth. Thus when the bin 52 contains an over supply of tape, light from lamp 145 to both of the photocells 142 and 146 is cut off by the vane 123 thereby causing the drive motor 18 to rotate in its forward direction. This causes the drive motor 18 to rotate the reel 12 in a counterclockwise direction as viewed in the figure so as to withdraw tape from the bin 52. When the bin 52 contains the correct amount of tape, i.e., the weight of tape plus bin 52 equals the weight of counterweights 92 and 161, the drive motor 18 is turned off since the photocell 146 is cut off from and the photocell 142 is exposed to light from the lamp 145. When there is an under supply of tape in the bin 52, both the photocells 142 and 146 are exposed to the light of the lamp 145 and the tape is run into the bin 52 due to rotation of the drive motor 18 in its reverse direction.

It can be seen that the controls for activating the drive motors 16 and 18 operate independently of each other, but nevertheless cooperate to maintain the desired amount of tape in each bin. Thus, if the reel 10 is almost completely full and the reel 12 is almost empty, one turn of reel 10 will take up or feed out more tape than one turn of the reel 12. Thus, where reels 10 and 12 rotate at the same speed, to keep the amount of tape in bins 50 and 52 equal, the reel 12 will ordinarily operate continuously while reel 10 will ordinarily operate intermittently. This makes possible an accommodation for the increased rate at which tape is being fed into or out of bin 50 as compared to the rate that tape is being fed into or out of bin 52. When both of the reels 10 and 12 are filled about equally and the apparatus is in operation, the reels 10 and 12 will ordinarily operate continuously. When the reel 12 becomes filled and the reel 10 is nearly empty, the reel 10 will ordinarily operate almost continuously and the reel 12 will ordinarily operate intermittently to allow for the greater length of tape which is wound onto or off from the reel 12 for each revolution of reel 12. Moreover, if the tape on one of the reels is more loosely wound than the other reel, the difference in the length of tape withdrawn or wound in by each reel in a given number of revolutions will not permanently affect the quantity of tape contained in each of the bins because of the independent control of the quantity of tape in each bin.

As can be seen, the invention allows the storage of a relatively large quantity of tape in each of the bins thereby permitting very rapid acceleration of the tape through the capstan without the danger that the supply of tape in one of the bins will be exhausted before the reel from which the tape is withdrawn to fill the bin has accelerated to the necessary speed thus reducing the chance for breakage of the tape.

In view of the principles set forth therein, I have shown some of the ways of carrying out the present invention and some of the equivalents which are suggested by these disclosures.

What is claimed is:

1. In a tape handling apparatus having first and second reels capable of relatively slow acceleration, a capstan adapted to start, stop and rapidly accelerate tape extending between said reels, a first storage means for storing unwound tape extending between said first reel and said capstan and a second storage means for storing unwound tape extending between said second storage reel and said capstan, the improvement comprising a first sensing means for comparing the weight of said first storage means and the tape contained therein with a first predetermined weight, means for feeding the tape into said first storage means from said first reel when the weight of said first storage means and the tape contained therein is less than said first predetermined weight and for stopping rotation of said first reel when the weight of said first storage means and the tape contained therein is in balance with said first predetermined weight and for reeling tape onto said first reel from said first storage means when the weight of said first storage means and the tape contained therein exceeds said first predetermined weight, a second sensing means for comparing the weight of said second storage means and the tape contained therein with a second predetermined weight, and means for feeding tape into said second storage means when the weight of said second storage means and the tape contained therein is less than said second predetermined weight and for stopping rotation of said second reel when the weight of said second storage means and the tape contained therein is in balance with said second predetermined weight and for reeling tape onto said second reel from said second storage means when the weight of said second storage means exceeds said second predetermined weight.

2. A tape handling apparatus comprising a frame, first and second winding means rotatably mounted on said frame for winding said tape, first and second drive means connected with said first and second winding means respectively, a transducer mounted on said frame and operatively associated with a portion of said tape extending between said winding means, a capstan for rapidly starting, stopping, and reversing the direction of that portion of said tape associated with said transducer, a first storage means for storing a supply of unwound tape extending between said capstan and said first winding means, first sensing means for sensing the weight of said first storage means and the tape contained therein, first control means operatively associated with said first drive means and said first sensing means to start and stop said first drive means and control the direction of rotation thereof in response to changes in the weight of said first storage means and the tape contained therein, said first drive means being adapted to transfer tape from said first winding means into said first storage means in response to a decrease in the weight of said first storage means and the tape contained therein beyond a predetermined value, to withdraw tape out of said first storage means in response to an increase in the weight of said first storage means and the tape contained therein beyond a predetermined value and to stop rotation of said first winding means when the weight of said first storage means and the tape contained therein is between predetermined limits, a second storage means for storing a supply of unwound tape extending between said capstan and said second winding means, second sensing means for sensing the weight of said second storage means and the tape contained therein, second control means operatively associated with said second drive means and said second sensing means to start and stop said second drive means and control the direction of rotation thereof in response to changes in the weight of said second storage means and the tape contained therein, said second drive means being adapted to transfer tape from said second winding means into said second storage means in response to a decrease in the weight of said second storage means and the tape contained therein beyond a predetermined value, to withdraw tape out of said second storage means in response to an increase in the weight of said second storage means and the tape contained therein beyond a predetermined value and to stop rotation of said second winding means when the weight of said second storage means and the tape contained therein is between predetermined limits.

3. A recording tape handling apparatus comprising a frame, first and second storage reels rotatably mounted on said frame, first and second reel drive motors connected to said first and second reels respectively, a transducer attached to said frame and operatively associated with a portion of said tape extending between said reels, a capstan for rapidly starting, stopping and reversing the direction of travel of said tape across said transducer, a first storage means yieldably attached to said frame for movement along a vertical axis, said first storage means being adapted to receive a quantity of unwound tape extending between said first reel and said capstan, a first sensing means operatively connected to said first storage means and operatively connected to said first drive motor for sensing the weight of said first storage means and the tape contained therein, a first control means for controlling the operation of said first drive motor in response to changes in the weight of said first storage means, a second storage means yieldably attached to said frame for movement along a vertical axis, said second storage means being adapted to receive a quantity of unwound tape extending between said second reel and said capstan, a second sensing means operatively connected to said second storage means and said drive motor for sensing the weight of said second storage means, and a second control means for controlling the operation of said second drive motor in response to changes in the weight of said second storage means.

4. A magnetic tape handling apparatus comprising in combination a frame, first and second storage reels for storing a supply of recording tape, first and second drive motors operatively connected to said first and second storage reels respectively, a transducer operatively associated with a portion of said recording tape extending between said reels, a capstan for advancing said tape across said transducer, said capstan being adapted to rapidly start, stop and reverse the direction of said tape as desired, a first storage bin adapted to receive tape extending between one of said storage reels and said capstan, a first yieldable support connected between said first storage bin and said frame, said storage bin being adapted to move upwardly when said bin is under-filled and downwardly when said bin is over-filled, a first sensing means to sense changes in the vertical position of said first storage bin, first control means operatively associated with said first sensing means and the said first drive motor to control the operation of said drive motor in response to changes in the vertical position of said first storage bin, a second storage bin adapted to receive a quantity of tape extending between said capstan and said second storage reel, a second yieldable support means connected between said second storage bin and said frame, said second storage bin being adapted to move vertically upward and downward on said yieldable support in response to changes in the quantity of tape in said second storage bin, a second sensing means to sense the vertical position of said second storage bin, control means operatively connected with said second sensing means and said second drive motor to control the operation of said second drive motor in response to the vertical position of said second storage bin, whereby the amount of tape contained in said first and second bin is maintained within predetermined limits.

5. A tape handling apparatus according to claim 4 wherein said first yieldable support comprises a first lever arm pivotally connected to said frame, a first counterweight connected to one end of said first arm, said first bin being connected to the other end of said first lever arm, said second yieldable support comprises a second lever arm pivotally connected to said frame, a second counterweight connected to one end of said second arm, and said second bin being connected to the other end of said second lever arm, said first counterweight being adapted to balance the weight of said first bin when said first bin is filled with a predetermined amount of said tape, said second counterweight being adapted to balance the weight of said second bin when said second bin is filled with a predetermined amount of tape.

6. A tape handling apparatus according to claim 4 wherein said first control means comprises a first electric switch means operatively associated with said first bin and said first drive motor including, means to complete an electric circuit with said first drive motor adapted to cause rotation thereof in one direction when the weight of tape in said first bin falls below a first predetermined level and to cause rotation of said first drive motor in the other direction when the weight of tape in said first bin exceeds a predetermined value and to interrupt the electric circuit to said first drive motor when the weight of tape in said first bin falls between said first and said second predetermined values, and wherein said second control means comprises a second electric switch means operatively associated with said second bin and said second drive motor including, means to complete an electric circuit with said second drive motor adapted to cause rotation thereof in one direction when the weight of tape in said second bin falls below a predetermined value and to cause rotation of said second drive motor in the other direction when the weight of tape in said second bin exceeds a predetermined value and to interrupt the electric circuit to said second drive motor when the weight of tape in said second bin falls between said predetermined values.

7. In a tape handling apparatus having first and second reels capable of relatively slow acceleration, a capstan adapted to start, stop and rapidly accelerate tape extending between said reels, a first storage means for storing unwound tape extending between said first reel and said capstan and a second storage means for storing unwound tape extending between said second storage reel and said capstan, the improvement comprising a first and second yieldable support for said first and second storage means respectively including first and second lever arms pivotally connected to said frame, said first and second storage means each being connected to one end of said first and second lever arms respectively, first and second counterweights connected to the other ends of said first and second lever arms respectively, said first counterweight being adapted to balance the weight of said first storage means and the tape contained therein when said first storage means is filled with a predetermined amount of tape, said second counterweight being adapted to balance the weight of said second storage means and the tape contained therein when said second storage means is filled with a predetermined amount of tape, a first sensing means for comparing the weight of said first storage means and the tape contained therein with said first counterweight, means for feeding the tape into said first storage means from said first reel when the weight of said first storage means and the tape contained therein is over balanced by said first counterweight and for stopping rotation of said first reel when the weight of said first storage means and the tape contained therein is in balance with said first counterweight and for reeling tape onto said first reel from said first storage means when the weight of said first storage means and the tape contained therein over balances said first counterweight, a second sensing means for comparing the weight of said second storage means and the tape contained therein with a second counterweight, means for feeding tape into said second storage means when the weight of said second storage means and the tape contained therein is over balanced by said second counterweight and for stopping rotation of said second reel when the weight of said second storage means and the tape contained therein is in balance with said second counterweight and for reeling tape onto said second reel from said second storage means when the weight of said second storage means and the tape contained therein over balances said second counterweight.

References Cited in the file of this patent

UNITED STATES PATENTS 2,730,309 Baer ------------------ Jan. 10, 1956